United States Patent
Davies et al.

(10) Patent No.: US 8,047,416 B2
(45) Date of Patent: Nov. 1, 2011

(54) FASTENER FEED METHOD AND APPARATUS

(75) Inventors: Robert Paul Davies, Gwernaffield (GB); Ian Campbell Ross, Whitford (GB); Neal Sean Williams, Warrington (GB); Geraint Richard Hughes, Penrhyn Bay Llandudno Conway North Wales (GB)

(73) Assignee: Henrob Limited, Flintshire (GB)

( * ) Notice: Subject to any disclaimer, the term of this patent is extended or adjusted under 35 U.S.C. 154(b) by 597 days.

(21) Appl. No.: 12/066,921

(22) PCT Filed: Aug. 1, 2006

(86) PCT No.: PCT/GB2006/002865
§ 371 (c)(1),
(2), (4) Date: Mar. 14, 2008

(87) PCT Pub. No.: WO2007/031701
PCT Pub. Date: Mar. 22, 2007

(65) Prior Publication Data
US 2009/0266866 A1 Oct. 29, 2009

(30) Foreign Application Priority Data

Sep. 14, 2005 (GB) .................................. 0518696.0

(51) Int. Cl.
*B25C 5/10* (2006.01)
*B25C 5/13* (2006.01)

(52) U.S. Cl. ........ 227/120; 227/107; 227/112; 227/114; 227/119

(58) Field of Classification Search ............... 227/107, 227/114, 119, 120, 121, 124, 125, 112; 414/332, 414/414, 416.04; 29/716, 798
See application file for complete search history.

(56) References Cited

U.S. PATENT DOCUMENTS 4,044,462 A * 8/1977 Anselmo ..................... 29/809
(Continued)

FOREIGN PATENT DOCUMENTS

DE 35 30 230 3/1987
(Continued)

OTHER PUBLICATIONS

GB0518696 Search Report, 1 page, Dated Feb. 3, 2006.
(Continued)

*Primary Examiner* — Rinaldi Rada
*Assistant Examiner* — Gloria R Weeks
(74) *Attorney, Agent, or Firm* — Michael Best & Friedrich LLP

(57) ABSTRACT

Fasteners, such as rivets (60), are fed to a fastener insertion tool (1) via a buffer magazine (5) adjacent to the tool. The buffer is movable with the tool and C-frame (6) between an operative position where fasteners can be inserted into a workpiece and a re-filling position where it is docked at a docking station (13) to reload. Fasteners are delivered to the docking station from a source (14) and held there ready for when the tool docks. Once docked a transfer gate (25, 28) is opened at an interface between the buffer magazine and the docking station and fasteners from the docking station are transferred into the buffer magazine. The quantity of fasteners in the buffer magazine is detected and the last fastener is retained so as to support preceding fasteners loaded into the buffer magazine. Any subsequently loaded fasteners back to the docking station either under gravity, under the influence of a pressurized gas or both. The gate is then closed and the insertion apparatus separates from the docking station.

92 Claims, 10 Drawing Sheets

U.S. PATENT DOCUMENTS

| | | | |
|---|---|---|---|
| 4,765,175 A * | 8/1988 | Denham et al. | 29/812.5 |
| 5,199,624 A * | 4/1993 | Smart et al. | 227/2 |
| 5,235,164 A * | 8/1993 | Noyama et al. | 235/375 |
| 5,465,868 A | 11/1995 | Bonomi | |
| 5,472,087 A | 12/1995 | Rink et al. | |
| 5,480,087 A * | 1/1996 | Young et al. | 227/112 |
| 6,000,596 A * | 12/1999 | Cariati | 227/112 |
| 6,079,604 A * | 6/2000 | Banducci et al. | 227/112 |
| 6,592,015 B1 * | 7/2003 | Gostylla et al. | 227/112 |
| 6,692,213 B1 * | 2/2004 | Butler | 414/412 |
| 6,944,944 B1 * | 9/2005 | Craythorn et al. | 29/798 |
| 7,131,564 B2 * | 11/2006 | Matthews et al. | 227/138 |
| 7,331,098 B2 * | 2/2008 | Matthews et al. | 29/524.1 |
| 7,409,760 B2 * | 8/2008 | Mauer et al. | 29/715 |
| 7,487,583 B2 * | 2/2009 | Craythorn et al. | 29/809 |
| 2004/0217144 A1 | 11/2004 | Matthews et al. | |

FOREIGN PATENT DOCUMENTS

| | | |
|---|---|---|
| EP | 0268462 | 5/1988 |
| EP | 0 618 022 | 10/1994 |
| GB | 1900/4967 | 1/1901 |
| WO | 00 07751 | 2/2000 |

OTHER PUBLICATIONS

GB0518696 Search Report, 1 page, Dated May 30, 2006.

PCT/GB2006/002865 International Search Report and Written Opinion, 13 pages, Dated Dec. 11, 2006.

* cited by examiner

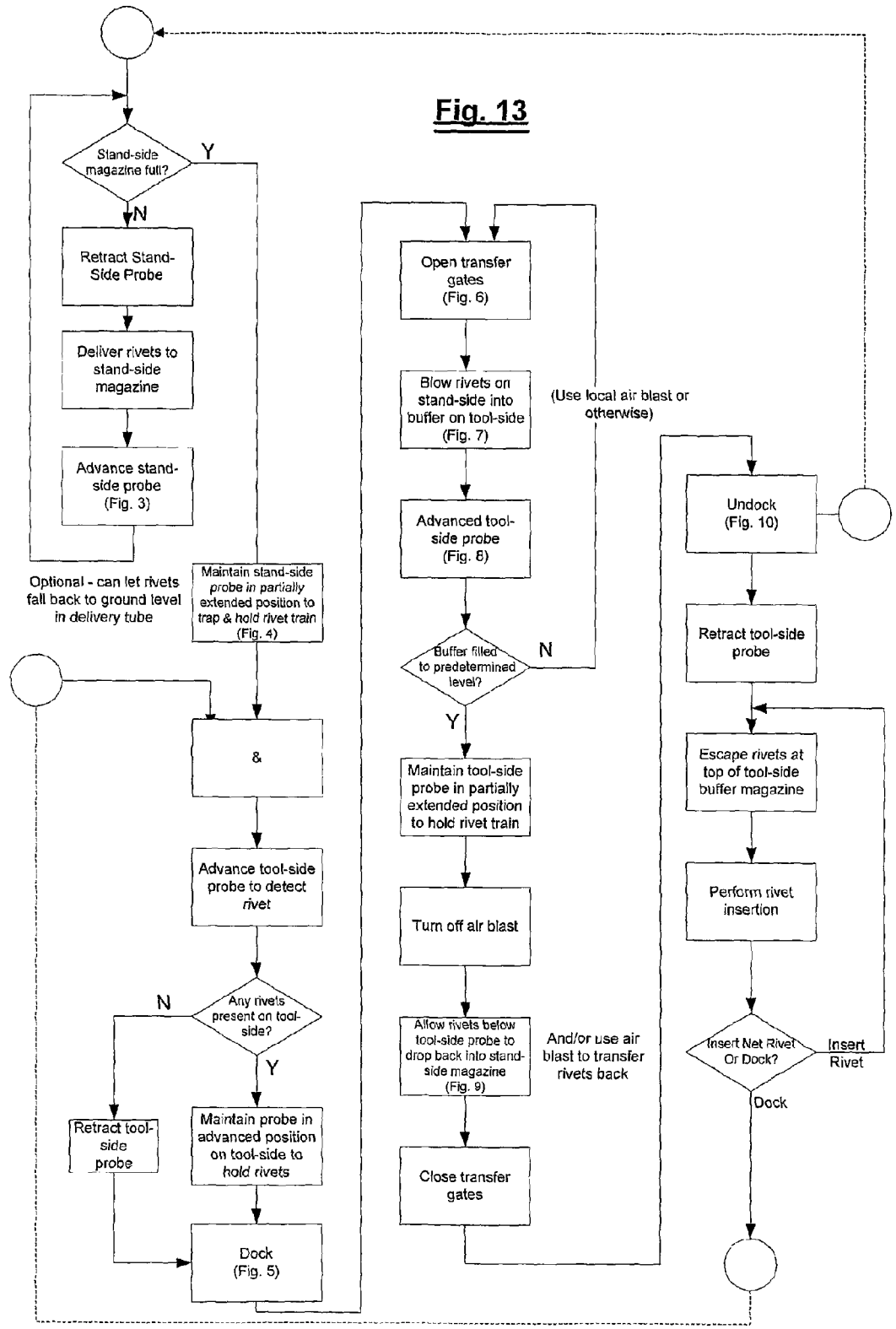

FASTENER FEED METHOD AND APPARATUS

CROSS-REFERENCE TO RELATED APPLICATIONS

This patent application is a national stage filing under 35 U.S.C. 371 of International Application No. PCT/GB2006/002865, filed 1 Aug. 2006, and claims priority to British Patent Application No. 0518696.0, filed 14 Sep. 2005, the entire contents of which are incorporated herein by reference.

The present invention relates to a fastener feed method and apparatus and in particular to improved aspects of fastener feed and delivery to and around fastener insertion apparatus.

The term "fastener" is used herein to include rivets, screws, slugs and other types of fastening devices.

It is well known in the field of riveting, and in particular self-piercing riveting, to feed rivets to a rivet setting tool via a delivery tube along which the rivets are propelled by, for example, blasts of compressed air. At the end of the delivery tube the rivet is typically transferred to a rivet delivery passage in a nose of the setting tool. Once the rivet has been delivered into the passage a punch descends along the rivet delivery passage and drives the rivet out of the nose and into the material to be joined. The force applied to the rivet is such that it pierces the top layer of material and is deformed by an upsetting die disposed below the material to provide a joint. The rivet deforms in such a manner that it does not penetrate through the material to the underside of the die.

Modern mechanical joining tools such as, for example, rivet setters are generally microprocessor controlled and often combined with robot technology. The setter tools are operated under the control of a computer program that provides instructions relating to the joining position and type (including fastener type and process parameters) for each joint to be effected in a particular workpiece. The type of fastening to be used is selected according to many factors including the size of the parts to be connected and the material from which they are made. A fastener delivery system associated with the tool must thus be able to cope with the supply of rivets of different sizes and types in any particular sequence without increase to the fastening cycle time and the tool must be able to produce a clinched joint with or without a fastener. In a continuous production environment, conventional self-piercing rivet setter tools are generally dedicated to a single rivet size and the problem of riveting combinations of different thicknesses and types of material that cannot be accommodated by a single rivet size is addressed by using several dedicated tools each applying a different rivet size. Obviously this requires careful planning and control as increased combinations of different joint thicknesses, types and strengths require additional rivet sizes and/or different clinching processes and therefore increased numbers of tools. Certain known fastening tools have twin feeds and are able to supply more than one type of fastener.

U.S. Pat. No. 5,465,868 describes a rivet feeding system in which there is a mobile buffer magazine, in the form of a bundle of tubes, connected between a plurality of remote bulk rivet sources and a rivet setter that is movable by a robot handler. Each buffer magazine is mounted at or near the rivet setter and is designed to contain the entire inventory of rivets for a given riveting operation. The bulk rivet source is floor-mounted remotely from the buffer magazine and comprises a plurality of rivet orientation devices such as vibratory feed bowls that deliver rivets to an inlet of the buffer magazine via delivery tubes. The bulk source of rivets is permanently connected to the buffer inlet by the tubes and the system operates by keeping the rivet level in the buffer magazine above a minimum so that the rivet setter is able to satisfy demand. The level of rivets in a tube of the magazine is detected directly by a sensor or indirectly by counting the rivets delivered to the tube. Tubes of a given bundle are filled with different rivet types/sizes. The path taken by a given rivet is determined by various selector devices that are operated by a programmable controller. A first selector device directs a rivet released from the source to a chosen buffer magazine, each magazine has a second selector device at inlet to select the tube into which the rivet is loaded and a third selector device at is outlet to select the desired rivet from the appropriate tube and direct it to the setter. The buffer magazine refilling cycle is carried out whilst the rivet setter is in operation.

A significant problem with the above-described system is that the range of movement of the robotic manipulator that carries the rivet setting tool is limited as the latter remains in permanent connection with the rivet supply. Delivery tubes are delicate and susceptible to kinking and entrapment or entanglement with other fixtures when the tool is manipulated (manually or automatically) in all three axes of movement. The inner profile of the tubes can be distorted to an extent that rivets become trapped in constrictions in the tube. Moreover, the connection of the tube to the setting tool can restrict access and provides for a bulky arrangement in that the tube must move up and down with the stroke of the nose of the setting tool during insertion of a rivet into a workpiece.

Our European Patent No. 1102650 describes many aspects of a fastener delivery system and, in particular, the concept of using a buffer magazine of fasteners situated at the tool without restricting the movement of the setting tool. The buffer magazine may be permanently attached to the setting tool and re-loadable by docking at its upper end with a delivery tube that is fed with fasteners from a bulk source or, alternatively, when empty, the magazine may be exchanged manually or automatically for a full magazine. The magazine provides for a buffer of fasteners that allows the fastener-setting tool to perform a cycle of riveting processes without awaiting connection of a delivery tube and delivery of a fastener. Periodically, between work cycles, the buffer magazine can be refilled by docking with the delivery tube and effecting transfer of rivets from the appropriate bulk source. The fasteners are propelled along the delivery tubes by a source of pressurised gas or air at the source end. The end of the delivery tube is tapered and is inserted into the upper end of the buffer. The docking operation serves to open jaws at the end of the tube so that rivets present in the end of the delivery tube can fall into the buffer magazine whilst others may be blown by the source of pressurised gas.

Our US patent 2004/0217144 also describes rivet insertion apparatus that has a feeder system with a buffer magazine. Rivets are propelled, under the influence of pressurised gas or air along a flexible delivery tube from a bulk source to an inlet of a buffer magazine via a docking station. Once buffer magazine is loaded the docking station can be disconnected and the rivets in the magazine are fed individually to the setting tool via an escapement mechanism. In this design the buffer magazine is supported on a robot mounting plate and its outlet is connected to the nose of the setting tool by a further flexible delivery tube.

U.S. Pat. No. 5,472,087 describes a rivet feed system that comprises a plurality of vertically mounted cartridges, each being designed to receive rivets of a given size. The base of each cartridge has a rivet escapement mechanism that effects transfer of the lowest rivet in the cartridge to a passageway that feeds the rivet setter. The rivet cartridges are fed off-line by means of a vibrating bowl feeder and a rotary cam mechanism that feeds rivets individually into the bottom of the cartridge. The cam mechanism continues the feed operation until the stack of rivets in the cartridge triggers a proximity switch located towards the top of the cartridge.

One difficulty with existing rivet feed systems of the kinds described above is that the control system relies on keeping an inventory of rivets and their respective positions around the system. For example, the control system counts the rivets either as they leave the bulk source or as they enter the buffer magazines and again as they are demanded by the setting tool or as they leave the magazine, so that the quantity of rivets in the magazine can be determined at any point in the cycle and a decision can be taken whether or not to refill the buffer. If the riveting cycle is interrupted at any point as a result of a fault such as a jam, operator intervention is generally required and this often involves moving rivets from the positions last tracked by the control system. Moreover, occasionally more rivets are used in a particular riveting cycle than expected. The information regarding rivet quantities and locations stored in the memory of the control system is thus not always accurate. This can lead to the risk of the control system attempting to load too many rivets into the magazine on the tool side either by attempting to load an unknown quantity into the buffer or loading rivets into the buffer on top of an unknown quantity present in the buffer. Overfilling of the magazine can cause mechanical problems.

In circumstances in which excess rivets are supplied to a magazine the rivets back up to the delivery tube on the opposite side of the docking station to the magazine. This can cause wear and damage to the delivery tube, which is generally made of a flexible plastics material.

It is a continual requirement in the industry to improve the efficiency and reliability of the delivery of individual rivets from the bulk source to the rivet setting tool.

It is an object of the present invention to provide for an improved fastener feed apparatus that operates with increased reliability.

It is an object of the present invention to obviate or mitigate the aforesaid or other disadvantages.

According to a first aspect of the present invention there is provided a method for feeding fasteners to fastener insertion apparatus, the apparatus comprising a fastener insertion tool, a buffer for the temporary storage of fasteners in a track defined by the buffer, the buffer being proximate the tool and having an inlet and a delivery track for transporting fasteners from the buffer towards a fastener delivery passage of the tool, the insertion apparatus being movable between an operative position where it is able to insert fasteners via the delivery passage in the tool into a workpiece and a re-filling position where it is docked at a docking station so as to permit the buffer to be loaded with fasteners from a source of fasteners connected to the docking station, the method comprising the steps of moving the insertion apparatus to the refilling position, transferring fasteners from the docking station into the buffer via the inlet, then expelling from the buffer any excess loaded fasteners that are in excess of a predetermined level back to the docking station, and undocking the insertion apparatus from the docking station.

The method obviates the requirement to count and maintain quantities of fasteners in the memory of the controller for the fastener feed apparatus. Moreover, it enables the buffer to be filled without the risk of overfilling the consequential problems.

The method may also comprises the steps of detecting that the buffer is loaded with a predetermined quantity of fasteners and retaining at least the last loaded fastener in said predetermined quantity of fasteners so as to retain all preceding fasteners loaded into the buffer before expelling said excess loaded fasteners.

The excess loaded fasteners are ideally transferred back by being allowed to fall back into the docking station under the influence of gravity. In this instance the buffer is disposed in a substantially upright position and the fasteners are loaded from below. As an alternative or in addition the excess loaded fasteners are transferred back by directing a blast of pressurised gas at them so as to urge them towards the docking station. The gas pressure is preferably directed to impinge upon a leading one of the excess loaded fasteners The fasteners may have a head and a shank and may be loaded into the buffer such the longitudinal axes of the shanks are substantially perpendicular to the longitudinal axis of the magazine buffer. The fastener at said predetermined level may be held by a member coming into contact with the base or underside of its shank.

A probe may be used to hold said fastener at said level, the probe being extensible between a retracted position where it is clear of the track defined by the buffer and an extended position wherein extends into the track through a port in the buffer so as to hold the fastener at said level, the probe being in an extended position when holding the fastener. The probe may be used to perform the step of detecting when the buffer has been loaded to said predetermined level, the probe being movable between said retracted position and a fully extended position where it extends across the track thereby identifying that there is no fastener present at said level, the probe being in a partially extended position when it detects the presence of the fastener and being in contact with the fastener in the partially extended position.

After the insertion apparatus is docked a transfer gate at an interface between an inlet of the buffer and the docking station may be opened and said transfer gate is preferably closed before undocking the insertion apparatus.

Gas pressure is preferably used to blow the fasteners so as to transfer them from the docking station to the buffer. The gas pressure may be supplied from a port at the docking station or may be supplied from an alternative source.

Fasteners are preferably temporarily stored in the storage track at the docking station prior to transfer to the buffer. The storage track is preferably disposed in a substantially upright position.

Fasteners may be delivered to the storage track from a bulk source of fasteners prior to docking the fastener insertion apparatus with the docking station. The fasteners may be blown to the storage track in a delivery tube under gas pressure.

According to a second aspect of the present invention there is provided fastener feed apparatus for feeding fasteners to a fastener insertion tool, the apparatus comprising a movable buffer for the temporary storage of a plurality of fasteners in a track defined by the buffer, the buffer having an inlet and an outlet and being configured to be located proximate the tool and for movement therewith, a delivery track for transporting fasteners from an outlet of the buffer towards a fastener delivery passage of the tool, and a docking station at which the buffer is to be docked to enable it to be refilled with fasteners, a first docking interface defined at or near the inlet of the buffer and a second docking interface defined by the docking station, a first transfer device for transferring fasteners from the docking station into the buffer, and a retaining member for retaining a pre-selected quantity of fasteners in the buffer against movement back towards the docking station, any fasteners in the buffer in excess of said pre-selected quantity being allowed by the retaining member to move back towards the docking station.

There may be at least one transfer gate disposed at one of said first and second docking interfaces, the gate being movable between an open position whereby fasteners can be transferred past the gate from the docking stand to the inlet of the buffer and a closed position where fasteners are prevented from passing the gate The apparatus ideally comprises a second transfer device for transferring any excess fasteners transferred to the buffer behind the retained fasteners back to the docking station.

The second transfer device may comprise a passage for the direction of pressurised gas to a position in the buffer between the inlet and a predetermined distance from the outlet of the buffer, said predetermined distance corresponding to that which said pre-selected quantity of fasteners would occupy in the buffer. The passage may be defined in the transfer gate.

The transfer gate may comprise a member having a fastener opening therethrough, wherein in the open position the opening is aligned with the buffer track and in the closed position it is out of alignment therewith. The passage for direction of pressurised gas may be adjacent to the opening.

The transfer gate may be disposed at the inlet of the buffer.

The retaining member may be movable between a withdrawn position where it is does not contact the fasteners and an operative position where it extends into the buffer track at a pre-selected position between the inlet and a predetermined distance from the outlet of the buffer, said predetermined distance corresponding to that which said pre-selected quantity of fasteners would occupy in the buffer.

The buffer may have a housing and the retaining member may extend through a port in the housing and into the track when in the operative position such that, when in use, it contacts a fastener if present at said pre-selected position.

The buffer track may be designed to accommodate fasteners with a head and a shank, the track defining a support surface for supporting the underside of the head, and a relatively narrow opening for receipt of the shank.

The track may define a T-shaped cross-section opening, with the transition between the head and stem of the T defining the support surface. The retaining member, when in the operative position, may project into the track from a side opposite said surfaces so as, in use, to contact an underside of the shank of the fastener. The retaining member may be a slidable member mounted adjacent to the port in the buffer housing.

Means for detecting when the buffer is loaded with said pre-selected quantity of fasteners may be provided. This means may be the same as the retaining member.

The storage track may be defined by a housing and the probe is extensible through a port in the housing and into the track.

The transfer gate may be at the outlet of the delivery track. The transfer gate has a fastener opening that is aligned with the outlet of the storage track when the gate is in the open position and is not aligned when the gate is in the closed position. The transfer gate may comprise a first gate section at the buffer inlet and a second gate section at the outlet of the storage track, the two gate sections being movable in unison when the insertion apparatus is docked at the docking stand. The transfer gate sections may each define docking faces that come into abutment when the docking interfaces are docked.

The first transfer device may comprise a passage proximate the inlet of the storage track for supply of pressurised gas to the track in a direction towards the storage track outlet. The first transfer device may additionally comprises a second source of pressurised gas for propelling fasteners from the docking station to the buffer, the second source being connected to the passage.

According to a third aspect of the present invention there is provided fastener feed apparatus for feeding fasteners to a fastener insertion tool, the apparatus comprising a movable buffer for the temporary storage of a plurality of fasteners in a track defined by the buffer, the buffer having an inlet and an outlet and being configured to be located proximate the tool and for movement therewith, a delivery track for transporting fasteners from an outlet of the buffer towards a fastener delivery passage of the tool, and a docking station at which the buffer is to be docked to enable it to be refilled with fasteners, a first docking interface defined at or near the inlet of the buffer and a second docking interface defined by the docking station, a first transfer device for transferring fasteners from the docking station into the buffer, and a retaining member for retaining a pre-selected quantity of fasteners in the buffer against movement back towards the docking station, the retaining member being movable between a retracted position in which it is clear of said track and an extended position in which it extends into said track so as to contact a fastener when present.

According to a fourth aspect of the present invention there is provided fastener feed apparatus for feeding fasteners to a fastener insertion tool, the apparatus comprising a movable buffer for the temporary storage of a plurality of fasteners in a track defined by the buffer, the buffer having an inlet and an outlet and being configured to be located proximate the tool and for movement therewith, a delivery track for transporting fasteners from an outlet of the buffer towards a fastener delivery passage of the tool, and a docking station at which the buffer is to be docked to enable it to be refilled with fasteners, a first docking interface defined at or near the inlet of the buffer and a second docking interface defined by the docking station, a supply track for transporting fasteners from a source to the docking station, a further track in said docking station for transporting fasteners towards said buffer, a first transfer device for transferring fasteners from the track of the docking station into the buffer and comprising a passage defined at the second docking interface, the passage being intersecting the track in the docking station and being directed towards the buffer for directing pressurised gas to fasteners at the docking station.

According to a fifth aspect of the present invention there is provided fastener feed apparatus for feeding fasteners to a fastener insertion tool, the apparatus comprising a movable buffer for the temporary storage of a plurality of fasteners in a track defined by the buffer, the buffer having an inlet and an outlet and being configured to be located proximate the tool and for movement therewith, a delivery track for transporting fasteners from an outlet of the buffer towards a fastener delivery passage of the tool, and a docking station at which the buffer is to be docked to enable it to be refilled with fasteners, a first docking interface defined at or near the inlet of the buffer and a second docking interface defined by the docking station, a first transfer device for transferring fasteners from the docking station into the buffer, a retaining member for retaining a pre-selected quantity of fasteners in the buffer against movement back towards the docking station, the docking station comprising a storage track for the temporary storage of fasteners, the storage track and the buffer being substantially rigid.

Specific embodiments of the present invention will now be described, by way of example only, with reference to the accompanying drawings in which:

FIG. 13 is a flowchart illustrating the steps executed under the supervision of a controller in an exemplary method in accordance with the present invention;

Figure 1:
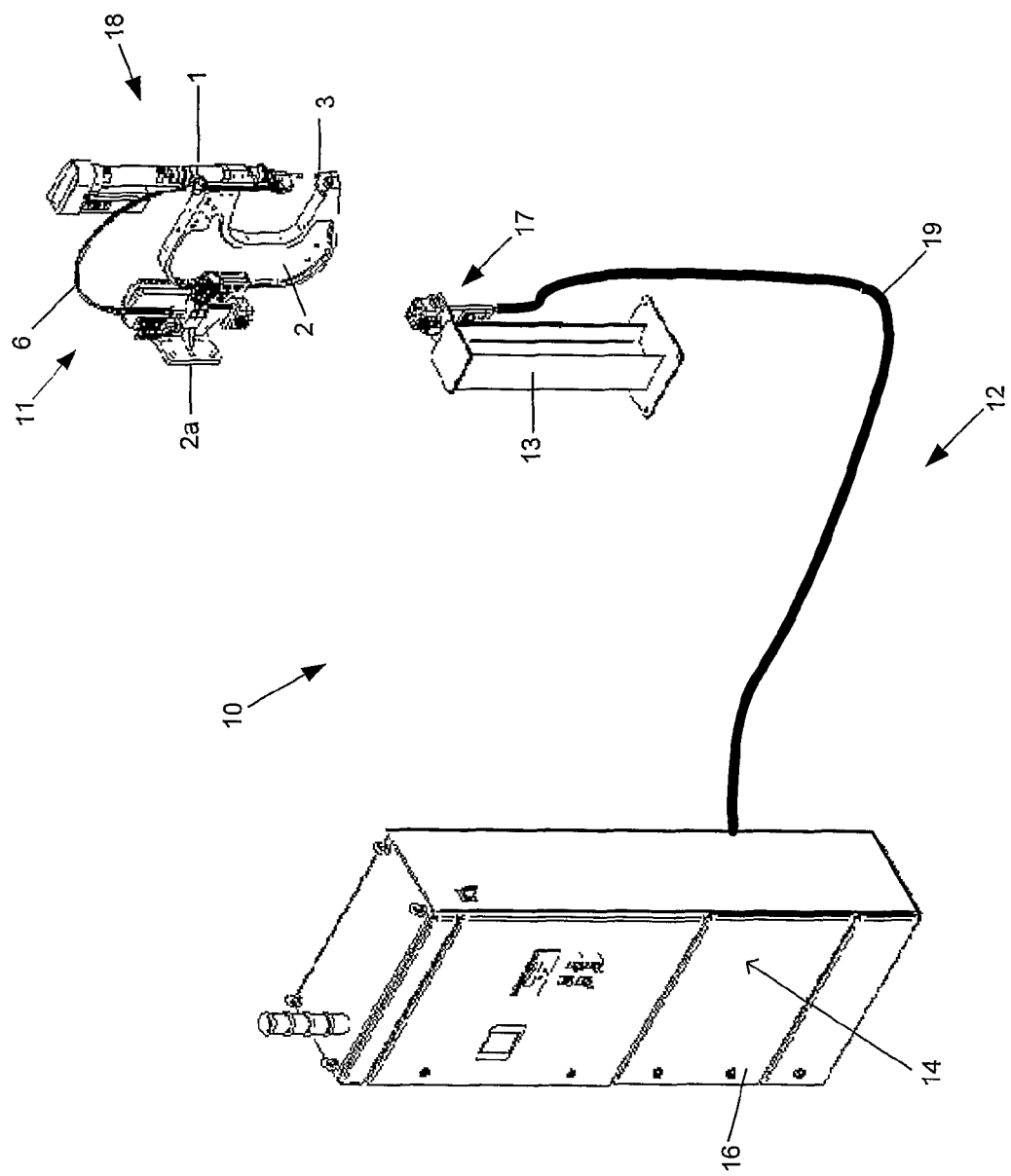
FIG. 1 is a perspective view of fastener feed and insertion apparatus in accordance with the present invention.
Figure 1A:
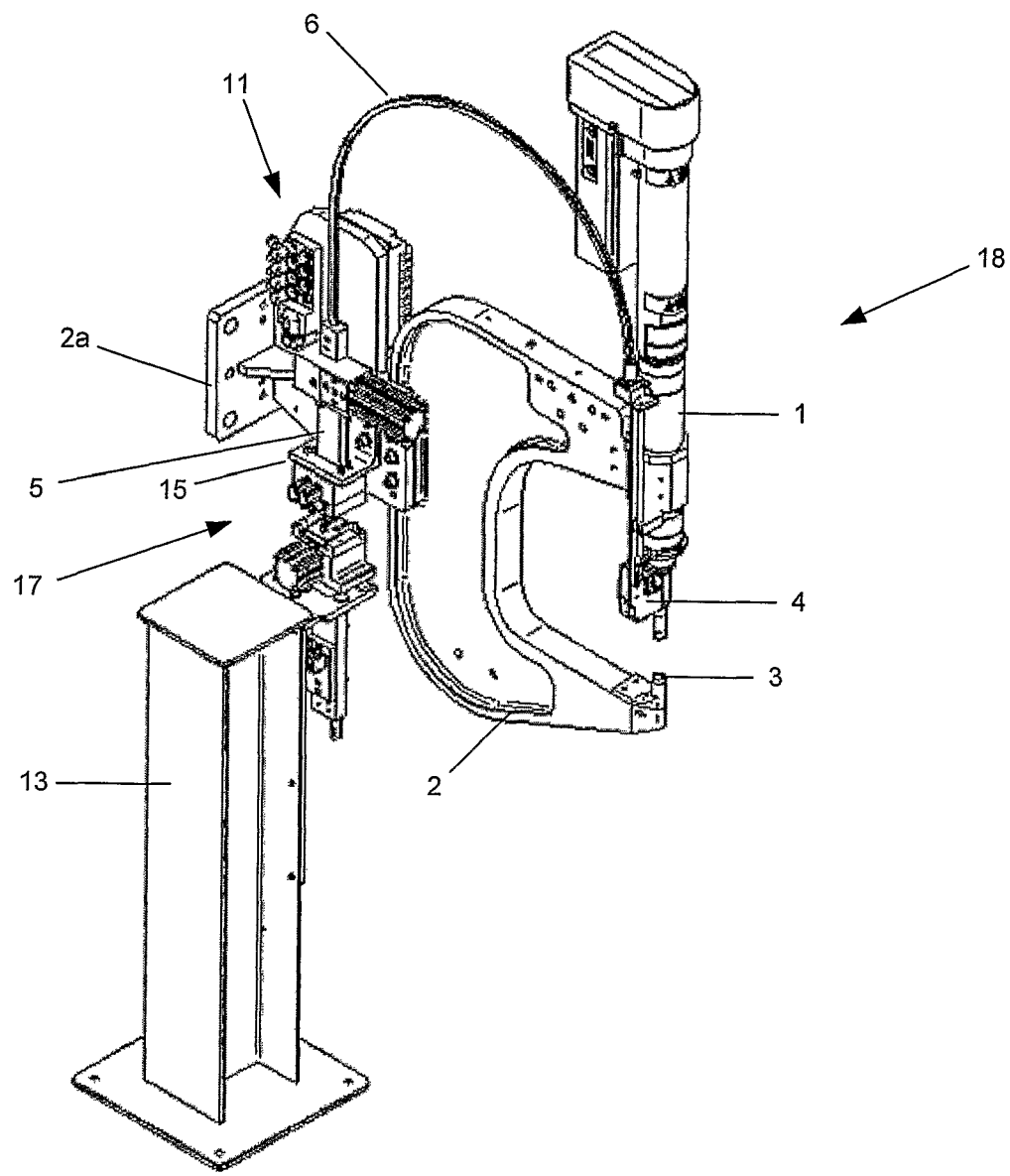
FIG. 1A is a perspective view showing the fastener insertion apparatus of FIG. 1 docking with a docking stand of the feed apparatus.
Figure 16:
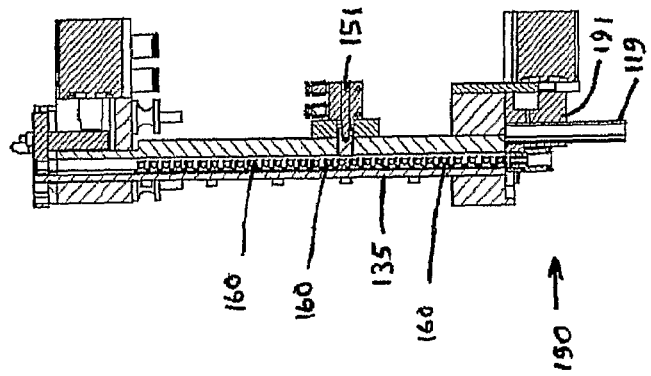
Figure 15:
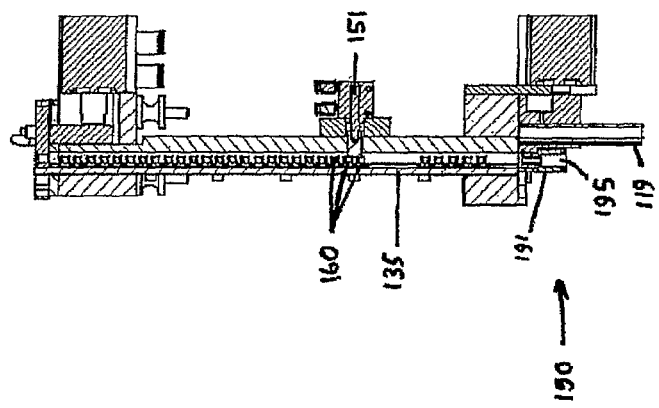
Figure 14:
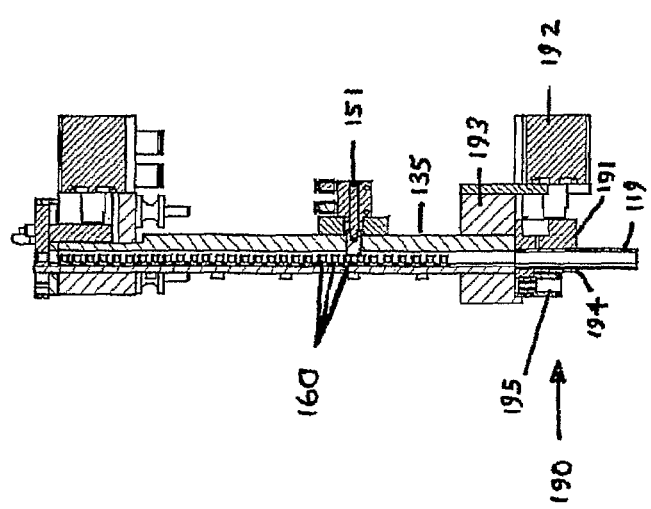

FIGS. 14 to 16 are sectioned side views of an alternative embodiment of the stand-side docking interface and magazine illustrating a filling sequence Referring now to FIGS. 1 and 1a of the drawings, the exemplary fastener feed apparatus, generally designated by reference numeral 10, is shown in relation to a rivet setting tool 1 mounted on an upper jaw of conventional C-frame 2 above a rivet-upsetting die 3 disposed on the lower jaw. Rivets (not shown in FIG. 1) are inserted by the tool into a workpiece (not shown) supported over the die 3 as is well known in the art. It is to be appreciated that whilst the specific embodiment described herein relates to the feeding and insertion of rivets it has application to other fasteners.

The C-frame is mounted on a robot manipulator (not shown) via a mounting bracket 2a such that it is movable with the tool 1 by the robot towards and away from the workpiece as required. The feed apparatus 10 comprises two principal sections 11, 12 that are releasably connectable together at a stationary floor-mounted docking stand 13 intermediate the tool 1 and a bulk source 14 of rivets. A first section 11, downstream of the docking stand 13, is carried on the C-frame 2 with the tool 1 and transports rivets from a tool-side docking interface 15 to a nose 4 of the tool 1 for insertion into the workpiece. A second section 12, which is principally upstream of the docking stand 13, is connected between the bulk source 14 of rivets stored in a cabinet 16 and a stand-side docking interface 17 supported on the docking stand 13. The two sections 11, 12 are releasably connectable at the docking stand 13 by bringing the docking interfaces 15, 17 into register. For convenience the apparatus that is upstream of the stand including, in particular, the setting tool 1, C-frame 2 and first section 11 of the feed apparatus 10, is collectively referred to herein as rivet insertion apparatus 18. As is known, the cabinet 16 not only houses the bulk source of rivets (e.g. vibratory bowls with rivet orientation mechanisms) but also the compressed gas (e.g. air) delivery systems required to propel rivets in the feed apparatus and a controller in the form of microprocessor-based hardware and operational software. Such gas delivery and control systems are well known and will not therefore be described herein.

The rivet insertion apparatus 18 is designed to dock with the docking stand 13 at predetermined intervals in the riveting operation to collect rivets for the next riveting cycle, such rivets being temporarily stored in a buffer magazine 5 that is integral with the first section 11 of the feed apparatus 10. The docking operation brings together the tool-side and stand-side docking interfaces 15, 17 of the rivet feed apparatus 10 and allows rivets to flow from the bulk sources 14 across the interfaces to the nose 4 of the setting tool 1 in a particular manner as described herein.

A buffer magazine 5 is connected between the tool-side docking interface 15 in the first section 11 of the rivet feed apparatus 10 and the inlet of a delivery tube 6 that is connected to the setting tool 1. Rivets are transported to the nose 4 of the tool 1 in the delivery tube 6 thereby allowing the tool 1 to perform a cycle of riveting processes without waiting for the connection of the delivery tube 6, delivery of the rivet and disconnection of the tube. Periodically, between work cycles, the buffer magazine 5 can be refilled by docking the rivet insertion apparatus 18 at the docking stand 13.

On the docking stand side a delivery tube 19 is connected between the bulk source 14 and the docking interface 17. Although not shown in the embodiment of figure, there may be more than one delivery tube 19 so as to allow different rivet types to be fed in parallel to the docking interface 17 and therefore into a plurality of separate rivet setting tools 1 operating in parallel.

In operation, rivets are supplied from the bulk source 14 into the delivery tube 19 and fed to the stand-side docking interface 17. The rivets may be fed singly or in groups and they may be fed in parallel along two or more delivery tubes, although the latter option is not shown in the figures. The additional delivery tubes may provide the same type of rivets to multiple rivet setting tools or different rivet types/sizes to multiple rivet setting tools or may simply be regarded as auxiliary delivery tubes should the main tube become blocked during a riveting operation. The docking interface arrangement is designed to allow rivets to be transferred reliably from the stand-side to the tool-side buffer magazine 5 so that the rivet insertion apparatus 18 has enough rivets to perform a given rivet cycle.

Figures 2A, 2B, 2C:
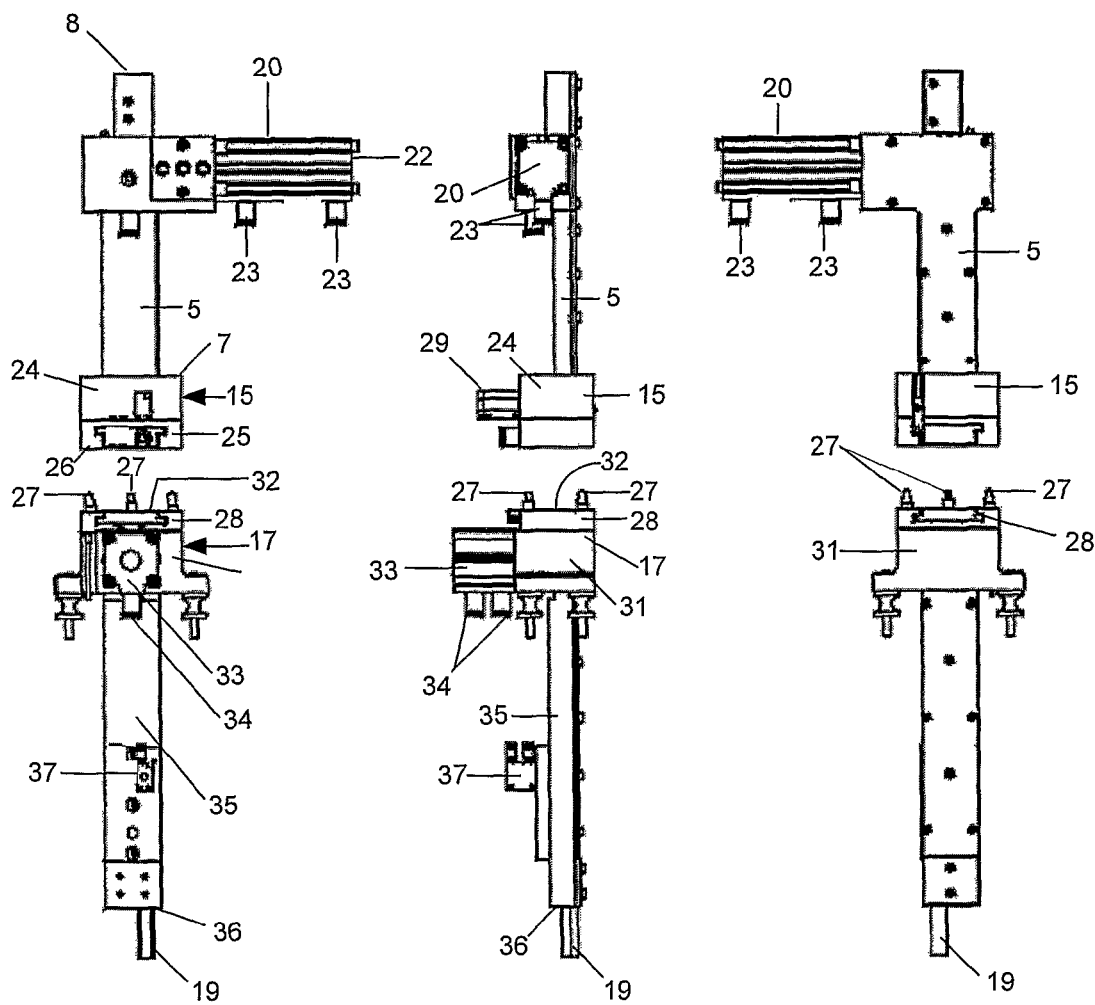
FIGS. 2A to 2C are front, side and rear views of a docking interface of the fastener feed apparatus.

Turning now to FIG. 2, the tool-side and stand-side docking interfaces 15 and 17 are shown separated but aligned in all the views A, B and C and are depicted together with neighbouring parts. The tool-side docking interface 15 is integrally connected to an inlet end 7 of the buffer magazine 5 whereas the opposite end of the magazine 5 has an outlet 8 that is designed to receive an end of the delivery tube 6. The interior of the buffer magazine 5 defines a track along which rivets can be stored in single file. At the outlet 8 an externally mounted pneumatic actuator 20 serves to operate an escapement gate 21 that is used to transfer rivets individually into the delivery tube 6. The housing 22 for the actuator has air supply connectors depicted at 23.

The tool-side docking interface 15 comprises a housing 24 having a sliding transfer gate 25 supported on its lowermost surface, the gate 25 defining a docking face 26, a rivet inlet (hidden) and alignment bores (hidden) for receipt of corresponding alignment pins 27 defined on the stand-side docking interface transfer gate 28. The side wall of the housing 24 supports an actuator 29 for an internal probe 30 (hidden in FIG. 2), the purpose of which will be discussed below. Both the buffer magazine 5 and interface 15 are formed from a rigid, hardwearing material such as hardened steel.

The stand-side interface 17 comprises a housing 31 that supports, on its upper surface, a sliding transfer gate 28 that defines a docking face 32 for abutment with the corresponding docking face 26 on the tool-side interface 15. The gate 28 has a rivet outlet (hidden) and the upstanding alignment pins 27 for receipt in the alignment bores of the tool-side interface 15. A pneumatic actuator 33 for operating the transfer gates 25, 28 is mounted on the side wall of the interface housing 31 and its operation is described below. Reference numerals 34 designate the air supply and return connectors for the actuator.

The stand-side docking interface housing 31 is integrally formed with a rigid magazine 35 that defines an internal rivet track, extends downwardly from the interface and terminates in an inlet 36 that is designed to receive an end of delivery tube 19. An actuator 37 for an internal probe is externally mounted on the magazine 35 intermediate the inlet 36 and the interface housing 31. The magazine 35 and the interface housing 31 are again manufactured from a rigid material such as hardened steel.

The delivery tubes 6, 19 and magazines 5, 35 all have an internal track with a T-shaped profile conforming to the outline of the rivets being fed. The tracks are designed to receive rivets such that they can be blown therealong by the compressed air individually or in groups in single file, with the head of the rivet being supported on a shoulder in the track defined by the transition between the shank and head of the T-shape. Examples of such delivery tubes are described in our European patent No. 1102650, the content of which is incorporated herein by reference.

Figure 3:
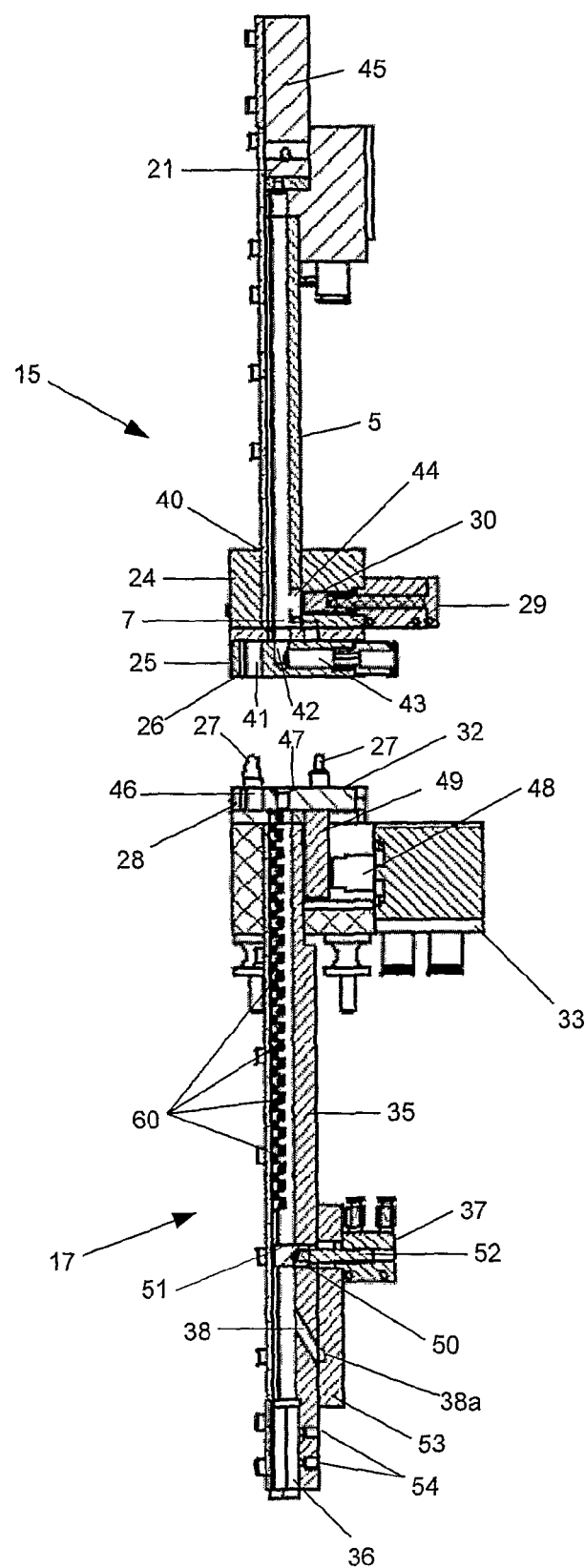
FIGS. 3 to 10 are sectioned side views of the docking interface of FIGS. 2A to 2C, some being enlarged views, illustrating the steps in transferring rivets from the stand-side interface to the tool-side interface.
Figure 4:
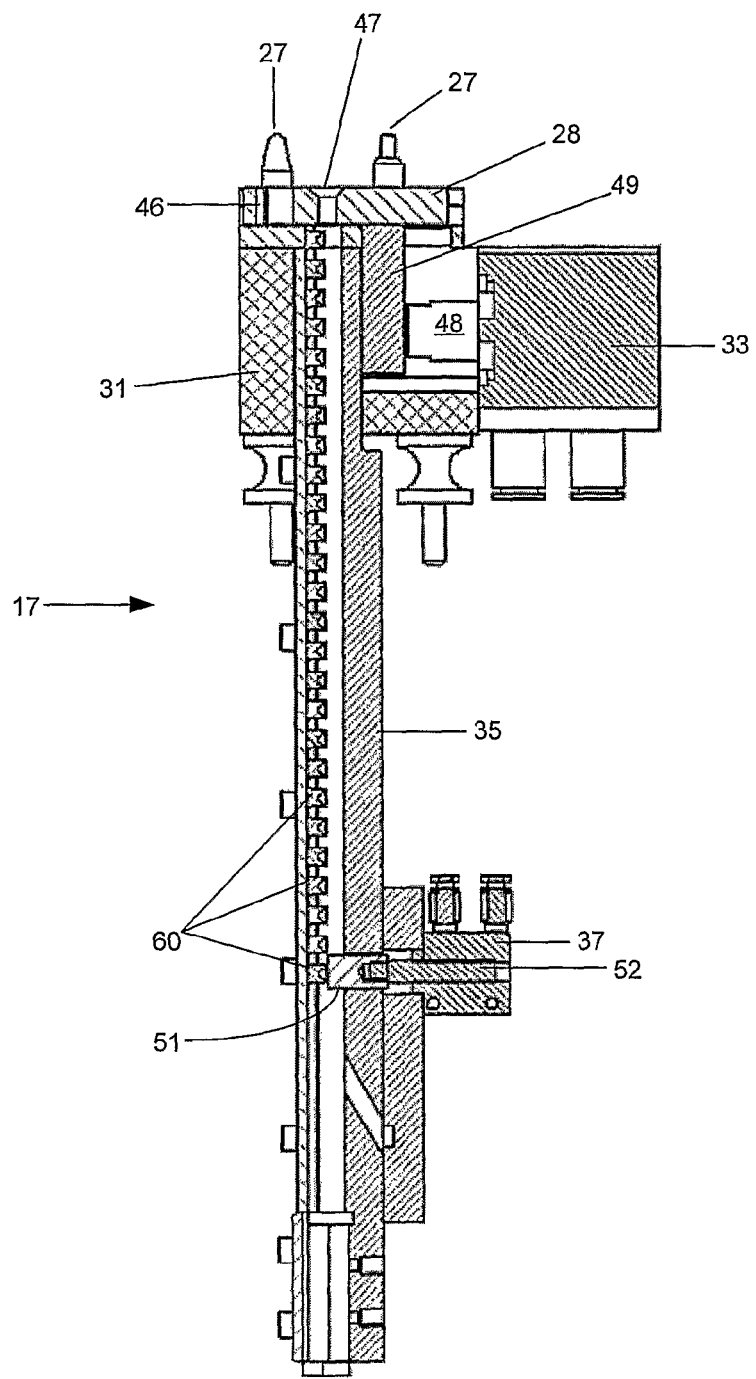

Referring now to FIG. 3, the interface housing 24 on the tool side has an aperture 40 into which the buffer magazine 5 is received. The inlet 7 of the magazine 5 is closable by the transfer gate 25 that is shown in more detail in this figure and comprises a thin plate penetrated by a T-shaped rivet aperture 41 extending between top and bottom surfaces. The gate 25 is slidable in a direction transverse to the axis of the aperture 41 (and buffer magazine 5) by the gate actuator 33 (FIG. 2) mounted on the stand-side. In addition to the rivet aperture 41, the gate 25 has a parallel blind bore 42 that is open to the top surface of the plate. A transverse air passage 43 extending along the opens into the bore 42 and provides communication between the blind bore and a compressed air supply (not shown). The transfer gate 25 is slidable between a closed position (as shown in FIG. 3) where the rivet aperture 41 is out of register with the track in the buffer magazine 5 and an open position (see FIG. 6) where it is in register to allow the passage of rivets. Immediately above the transfer gate 25, the buffer magazine 5 has a side port 44 that is aligned with the probe 30 mounted on the side of the interface housing 24. The probe 30 is shown in detail in FIG. 3 and comprises a member that is slidable by the actuator 29 (referred to above in relation to FIG. 2) between a first position where it extends through the side port 44 into the track of the buffer magazine 5 and a second retracted position as shown in FIG. 3 where it is clear of the track. The upper end of the buffer magazine 5 is received in a housing 45 for the escapement gate 21.

The transfer gate 28 on the stand-side interface is similar to that on the tool-side in that it is penetrated across its thinnest dimension by a rivet aperture 46 and is slidably mounted so as to move in a direction perpendicular to the central axis of the magazines 5, 35. The transfer gate 28 is shown in FIG. 3 in the closed position with the rivet aperture 46 out of register with the track of the magazine 35. Alongside the rivet aperture 46 there is an air vent 47 in the transfer gate 28 that is in alignment with the magazine 35 track. The transfer gate 28 is slidably operated by the pneumatic actuator 33 mounted externally on the magazine 35 and immediately below the plate. The actuator 33 is connected to the gate 28 by means of its rod 48 that is connected to a wall 49 that depends from the plate. When the two interfaces 15, 17 are docked the alignment pins 27 on the stand-side transfer gate 28 are received in the bores on the tool-side transfer gate 25 such that the two docking faces 26, 32 gates are brought into abutment and the gates 25, 28 are slidable in unison by the actuator 33 on the stand side. Towards the inlet end 36 of the stand-side magazine 35, there is a side port 50 for receipt of the stand-side probe. The probe is simply a slidable member 51 mounted on the end of a rod 52 of the actuator 37 that is movable between an extended position where it extends through the port 50 into the track and blocks the passage of rivets (as shown in FIG. 3) and a retracted position where it is clear of the track. It will be seen in FIG. 3 that a number of rivets 60 have been blown from the source 14 along delivery tube 19 and into the magazine 35. Immediately below the probe 51 there is an air blast passage 38 perforating the wall of the magazine 35 and extending in an upwardly inclined direction into the track. An inlet 38a to the passage 38 is defined in a mounting plate 53 for the probe actuator 37 and in the drawing of FIG. 3 extends into the page.

At the inlet end 36 of the stand-side magazine 35 there are two fixing apertures 54 for securing the delivery tube 19 (not shown in FIG. 3) that is received in the inlet 36.

The rivet feed operation will now be described with reference to FIGS. 1, 1A, 3 to 10, and FIG. 13, the latter being a flowchart summarizing the steps in the operation. In some of these figures the delivery tubes 6, 19 and the various actuators are not shown for clarity but the gates 25, 28 and probes 30, 51 are depicted. In FIGS. 1A and 3 the interfaces 15, 17 are shown separated, with the stand-side magazine 35 containing rivets 60 supplied from the bulk storage 14 via delivery tube 19 and ready for transfer to the tool side.

The pneumatic actuators 20, 29, 33 are all operable by the controller. It is to be appreciated that actuators need not necessarily be pneumatic but, for example, could be hydraulically or electrically operated.

On demand by the controller, rivets 60 are blown by compressed air in a conventional manner from the bulk source 14 towards the stand 13 where they collect. Intermediate air boost supplies may be used if required at predetermined positions along the delivery tube 19. Whilst the air pressure is applied, the rivets 60 collect in the magazine 35 at the end of the delivery tube 19. At predetermined time intervals during the rivet feed process, the controller sends a signal to the actuator 37 for the probe 51 on the stand-side magazine 35 to move it to the extended position to identify whether a rivet is present at that position in the magazine (FIG. 3) and therefore if the magazine is full. A typical filling sequence might be to blow a group of rivets, say five, from the source 14 to the stand magazine 35 and then advance the probe 51 to detect whether or not the magazine 35 is full. If the probe 51 extends all the way across the track to the opposite wall of the magazine 35 then the controller can deduce from the length of travel of the actuator rod 52 that the magazine is not full in which case the probe 51 is retracted and a further group of five rivets 60 are blown along the delivery tube 19 to the magazine 35. The process is repeated until the extension of the probe 51 (and therefore the travel of the rod 52 of the actuator 37) is limited by the presence of a rivet. In such an instance the tip of the probe 51 comes into contact with the underside of the rivet shank (FIG. 4) and the controller deduces that the magazine 35 is full operates to stop the fill sequence. Once a rivet 60 is detected by the probe 51 it can either remain in the partially extended position in contact with the shaft of the rivet to support the train of rivets in the magazine or, since the filling sequence has been halted, it can be retracted so that they can simply be allowed to fall backwards into an end portion of the delivery tube under gravity. It is to be understood that the use of a probe is described purely by way of example; other methods for detecting the presence of a rivet at a particular location in the magazine may be used including, for example, proximity transducers or other sensors.

Figure 5:
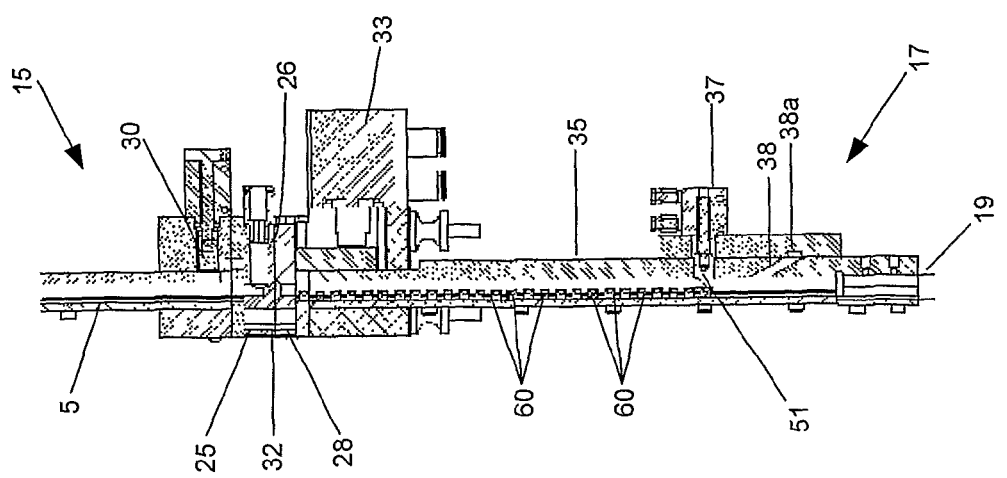
Figure 10:
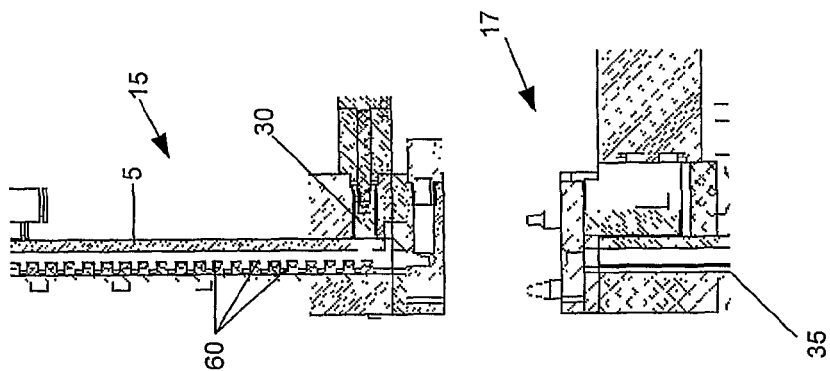
Figure 9:
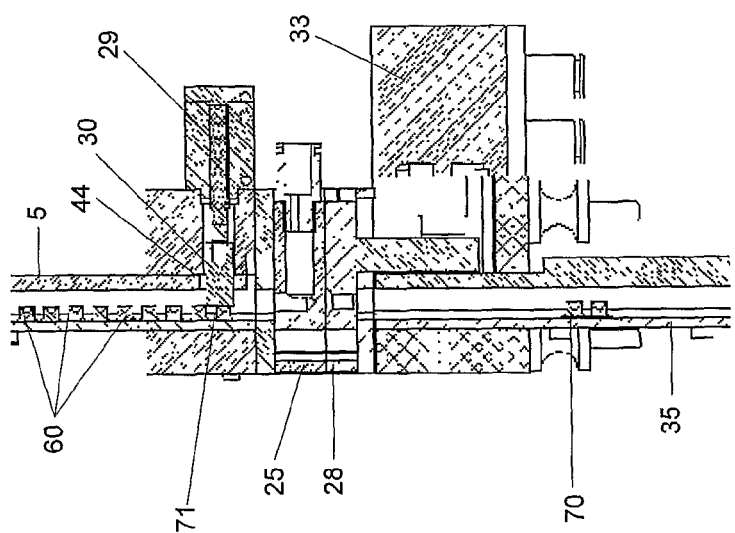

Once controller detects from the probe actuator 37 that there are sufficient rivets at the docking stand, the rivet insertion can dock when there is a need to load the buffer magazine 5 with rivets. FIG. 5 shows the two docking interfaces 15, 17 when the rivet insertion apparatus 18 is docked with the stand 13. It will be seen that the transfer gates 25, 28 are engaged with docking faces 26, 32 in abutment and are in the closed position. The tool-side probe 30 is in the retracted position and the probe 51 for the stand-side magazine 35 is partially extended to support the train of rivets 60 that extends upwardly in the magazine 35.

Figure 7:
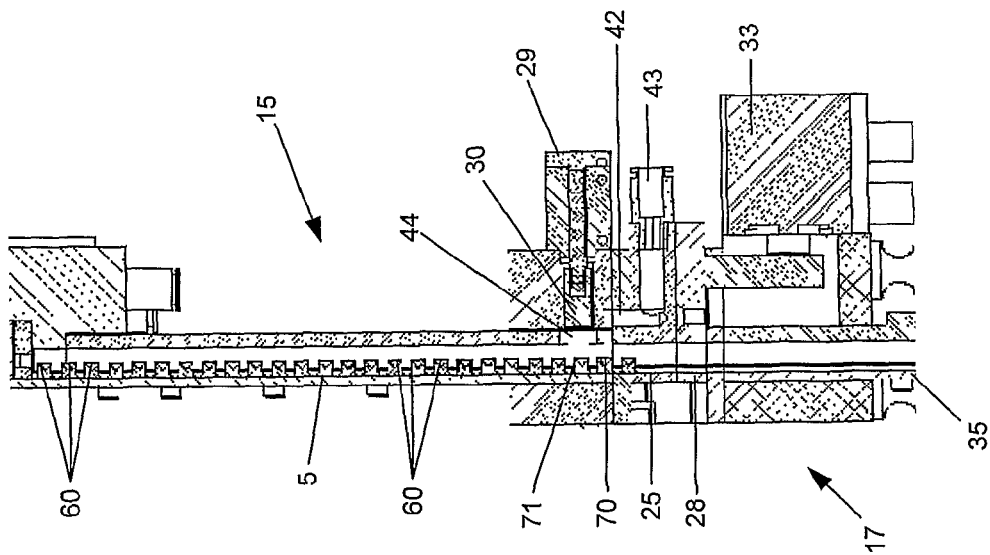
Figure 6:
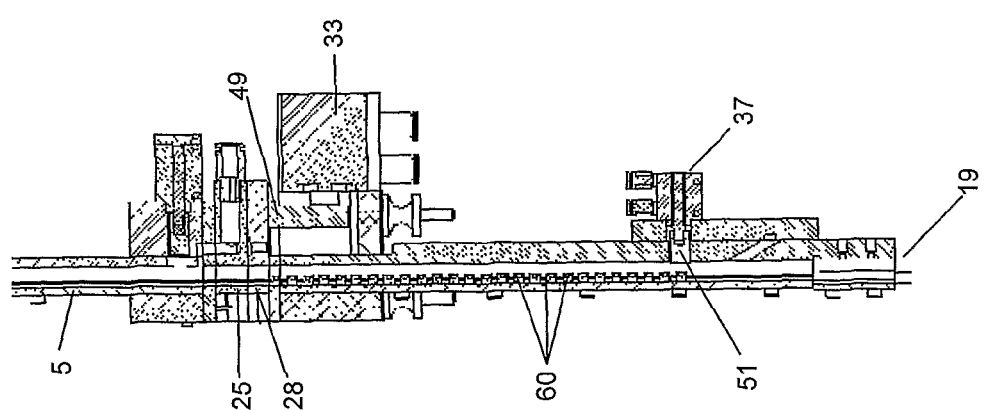
Figure 8:
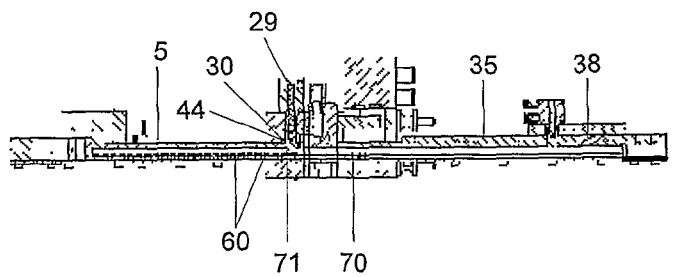

Once the insertion apparatus is docked the controller operates the air supply to apply a localised air pressure blast via the inlet 38a and passage 38 to urge the rivets upwardly in the magazine. The probe 51 can then be retracted (see FIG. 6) whilst the rivets 60 are maintained in position by the air blast. The transfer gate actuator 33 is then operated to retract the wall 49 and therefore to move the gates 25, 28 to the open position (as shown in FIG. 6) so as to allow the rivets 60 in the magazine 35 or in the end of delivery tube 19 to be blown through the interfaces 15, 17 and into the tool-side buffer magazine 5 (FIG. 7). The tool-side probe 30 is then advanced by actuator 29 through the side port 44 to determine whether or not there is a rivet 60 present in the position immediately adjacent thereto. If a rivet 60 is present this means that the buffer magazine 5 is full and the tool-side probe 30 remains in the partially extended position to hold the rivets in place (FIG. 8). The air supply from the passage 38 that propels the rivets across the interface is then turned off. As an alternative to the localised air blast it is to be understood that the air pressure may be supplied remotely from the stand i.e. at or near the bulk source. This arrangement allows excess rivets below the tool-side probe 30 to fall back into the stand-side magazine 35 and delivery tube 19 under gravity. An air blast may be applied through the passage 43 and bore 42 in the tool-side transfer gate 25 to assist in urging the excess rivets back to the stand side. It will be appreciated that the air blast egresses from the bore 42 and impacts upon the rivet 70 (see FIGS. 7 and 8) immediately below the rivet 71 that is held by the gate probe 30 so as to urge any excess rivets backwards.

The transfer gate actuator 33 is then retracted to move the gates 25, 28, in unison, to the closed position (FIG. 9) and the rivet insertion apparatus 18 disconnects from the docking stand 13 (FIG. 10) so as to separate the docking interfaces 15 and 17. At this point in the cycle the tool-side probe 30 can be retracted to unclamp the rivet train 60 in the buffer magazine 5 and the rivets can be delivered to the nose 4 via the delivery tube 6 by the escapement mechanism 21 at the outlet 8 of the buffer magazine 5 in a known manner.

Immediately before the rivet insertion apparatus docks with the docking stand, the tool-side probe 30 is advanced to identify whether or not any rivets are present in the buffer magazine 5 in the manner described above. If it does detect the presence of at least one rivet it remains in the partially extended position so that it is trapped by tool-side probe 30 before docking. In such an instance the controller operates to retract the tool-side probe 30 once the transfer gates 25, 28 are open and the air blast applied.

It will be appreciated that the two probes 30, 51 are housed within sealed areas so that compressed air does not escape through the side ports 44, 50 in the magazines 5, 35.

The buffer magazine 5 track is designed to hold a predetermined number of rivets and in the rivet transfer process only those that are fully within the buffer are retained, any excess rivets either being allowed to fall back, or being actively blown back, into the stand-side magazine 35. By using this method of rivet transfer the rivet insertion apparatus 18 has, immediately after docking, a known number of rivets for the riveting operation without the need to count the rivets into the buffer magazine 5. The present invention provides for a feed system that is tolerant of attempts to overfill the buffer magazine and so if an operator is unsure of the number of rivets at the rivet insertion apparatus the docking and rivet feed operation can be executed without risk of overfilling. It therefore obviates the requirement to conduct an audit of rivets present in the apparatus or to rely on potentially inaccurate memory counts in the controller. Moreover, it removes the possibility of the buffer magazine being underfilled.

The use of tool-side probe 30 that is configured to hold a train of rivets 60 in the magazine 5 by engaging the shank of the last rivet in the train is advantageous in that it does not pass through or protrude into any of the sensitive surfaces of track defined by the head of the T-shape.

The provision of rigid magazines and their internal tracks ensures that wear at the docking interface is reduced.

Figure 12:
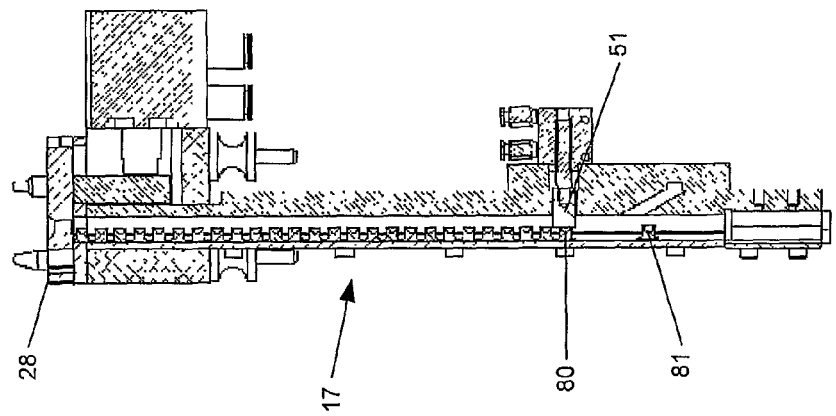
FIGS. 11 and 12 are sectioned side views of the stand-side docking interface and magazine illustrating the stand magazine filling sequence.
Figure 11:
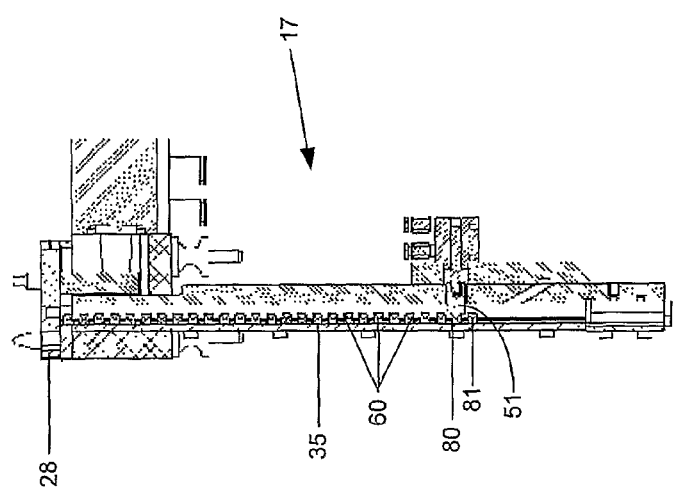

FIGS. 11 and 12 illustrate the sequence of filling the stand-side magazine 35. As described above rivets 60 may be supplied in groups, such as five at a time, from the bulk source 14 and the probe 51 advanced each time to detect whether the magazine 35 is full (see FIGS. 3 and 4). The sequence is repeated until the probe 51 engages the shank of a rivet 80. Any rivets 81 loaded behind that rivet 80 engaged by the probe 51 such as the one shown in FIG. 11 are left to descend under gravity (FIG. 12) and the filling sequence stops. It will be seen from the figures that the rigid, hard track of the magazine 35 extends below the position of the probe 51. This ensures that the rivets 60 to be held stationary are confined within the relatively hard-wearing magazine rather than in the flexible delivery tube 19 so as to avoid wear thereof.

In an alternative embodiment depicted in FIGS. 14 to 16 parts common to the above-described embodiment are given the same reference numerals but increased by 100 and are not further described except in so far as they differ from their counterparts of FIGS. 11 and 12. The main difference is the introduction of a gating device 190 at end of the stand-side delivery tube 119 immediately adjacent to the inlet 136 of the magazine 135. The gating device comprises a sealed gate member 191 that is slidable in a direction transverse to the longitudinal axis of the buffer magazine 135 by an actuator 192 (e.g. an pneumatic cylinder) that is fixed to a block 193 at the bottom end of the stand-side buffer magazine 135. The gate member 191 is penetrated by a first aperture 194 that is designed to receive the end of the delivery tube 119. In operation, the gate member 191 is movable by the actuator 192 between a first position (FIG. 14) in which the delivery tube track is in alignment with the track of the buffer magazine 135 and a second position (FIG. 15) where it is out of alignment. The gating device 190 has an integral blow feed by virtue of a local air blast passage 195 defined in the gate member 191 alongside the first aperture 194. When the gate member 191 is in the closed position the passage 195 is brought into alignment with the magazine track 135. The air blast passage 195 is selectively supplied with pressurised gas from a suitable source under the control of the control system.

The function of the gating device is to retain rivets within the hardened track of the stand-side buffer magazine so as to prevent them from dropping back down in the plastics delivery tube as there can be a tendency for the tube to wear.

The filling sequence is very similar to that described above and starts with rivets being blown by the main air blast from the bulk storage 14 along the delivery tube 119 towards the stand-side buffer magazine 135. In one embodiment the control system is configured produces four pulses of air to transport four rivets along the deliver tube 119 and then a fifth longer pulse of air that transports a fifth rivet towards the magazine and then, with the gate in the open position shown in FIG. 14, transfers all five rivets into the magazine 135. With this main blast still applied the probe 151 is extended into the track to detect whether a rivet is present. If no rivet is detected at this position in the track the probe remains in the extended position, thereby retaining the rivets above it, the gate member remains in the open position and another four rivets are transferred as before. On the fifth rivet the air blast is again longer and the probe is simultaneously retracted so as to allow the next group of rivets to travel up the magazine track. Again, with the main air blast still present the probe is extended to trap the rivets and to detect whether the magazine is full. This cycle of events is repeated until the magazine track is filled to a level such that probe detects the presence of a rivet. In FIG. 14 it can be seen that magazine is full to the level of the probe with several rivets below the probe being blow upwards. At this point the gate member is retracted to the closed position as shown in FIG. 15. The air supply to the delivery tube 119 and the pneumatic actuator of the probe is stopped so that the rivets in the magazine drop under gravity and rest against the closed gate (see FIG. 16). The magazine is now ready for the docking operation previously described. Once docked and the transfer gates opened the rivets are transferred across the docking station interface by air being directed to the air blast passage 195 which is now in register with the track of the magazine. It will be appreciated that the sealed nature of the gate member means that the air directed into the air blast passage is prevented from egressing down the delivery tube 119 and so the pressure applied by local blow feed is not impaired.

By incorporating the local air blast passage in the gating device the same pneumatic supply that provides the blast can be used both to operate the gate actuator.

In this embodiment the provision of the gating device allows the rivets that have dropped back to be retained in the stand-side magazine, which is made of hardened material, thereby avoiding the wear caused by rivets repeatedly dropping back into the plastics delivery tube.

It is to be appreciated that the riveting system may comprise two or more stands feeding one or more rivet insertion tools.

It is to be understood that the numerous modifications or variations to the above described apparatus and method may be made without departing from the scope of the invention(s) as defined in the appended claims. For example, each of the probes may be of a height that enables it to come into contact with and hold more than one rivet. Furthermore, it is to be appreciated that more than one magazine track and tube etc. may be provided in parallel. Moreover, the tool-side buffer magazine and stand-side magazine may take any appropriate shape. Finally, the probes that retain the fasteners in their respective magazines may take any appropriate form and may be replaced by a suitably directed air (or other gas) curtain that holds the fasteners in place.

The invention claimed is:

1. A method for feeding fasteners to fastener insertion apparatus, the apparatus comprising a fastener insertion tool, a buffer for the temporary storage of fasteners in a track defined by the buffer, the buffer being proximate the tool and having an inlet and a delivery track for transporting fasteners from the buffer towards a fastener delivery passage of the tool, the insertion apparatus being movable between an operative position where it is able to insert fasteners via the delivery passage in the tool into a workpiece and a re-filling position where it is docked at a docking station so as to permit the buffer to be loaded with fasteners from a source of fasteners connected to the docking station, the method comprising the steps of moving the insertion apparatus to the refilling position such that the buffer is docked to the docking station, transferring fasteners from the docking station into the buffer via the inlet, then expelling from the buffer any excess loaded fasteners that are in excess of a predetermined level back through the buffer inlet to the docking station, undocking the insertion apparatus from the docking station, transferring at least one fastener from the buffer to the fastener insertion tool, and then using the fastener insertion apparatus to insert a fastener into or onto a workpiece.

2. A method according to claim 1, further comprising detecting when the buffer is loaded with a predetermined quantity of fasteners and retaining at least the last loaded fastener in said predetermined quantity of fasteners so as to retain all preceding fasteners loaded into the buffer before expelling said excess loaded fasteners.

3. A method according to claim 2, the fasteners having a head and a shank and being loaded into the buffer such the longitudinal axes of the shanks are substantially perpendicular to the longitudinal axis of the buffer.

4. A method according to claim 3, wherein the last loaded fastener is retained by a member coming into contact with the base of its shank.

5. A method according to claim 2, wherein the last loaded fastener is retained by using a probe, the probe being extensible between a retracted position where it is clear of the track defined by the buffer and an extended position wherein extends into the track through a port in the buffer so as to hold the fastener, the probe being in an extended position when holding the fastener.

6. A method according to claim 5, the probe being used to perform the step of detecting when the buffer has been loaded to a predetermined level which corresponds to the buffer containing said predetermined quantity of fasteners, the probe being movable between said retracted position and a fully extended position where it extends across the track thereby identifying that there is no fastener present at said level, the probe being in a partially extended position when it detects the presence of the fastener and being in contact with the fastener in the partially extended position.

7. A method according to claim 1, further comprising the steps of opening a transfer gate at an interface between an inlet of the buffer and the docking station after the insertion apparatus has docked and closing the gate before undocking the insertion apparatus.

8. A method according to claim 1, wherein the buffer is disposed in a substantially upright position and the fasteners are loaded from below, the excess loaded fasteners being expelled under gravity.

9. A method according to claim 1, wherein the excess loaded fasteners expelled by transferring them back under the pressure of a gas.

10. A method according to claim 9, wherein the gas pressure is applied in a blast.

11. A method according to claim 9, wherein the gas pressure is directed to impinge upon a leading one of the excess loaded fasteners.

12. A method according to claim 9, wherein the gas pressure is delivered through a passage in the transfer gate.

13. A method according to claim 1, wherein gas pressure is used to blow the fasteners so as to transfer them from the docking station to the buffer.

14. A method according to claim 13, wherein the gas pressure is supplied from a port at the docking station.

15. A method according to claim 1, further comprising the step of escaping fasteners from an end of the buffer opposite the end at which it is loaded and feeding them to the tool.

16. A method according to claim 1, further comprising the step of providing a storage track at the docking station for interfacing with the buffer of the fastener insertion apparatus when docked.

17. A method according to claim 16, wherein fasteners are temporarily stored in the storage track at the docking station prior to transfer to the buffer.

18. A method according to claim 16, wherein the storage track is defined in a magazine at the docking station.

19. A method according to claim 16, wherein the storage track is disposed in a substantially upright position.

20. A method according to claim 16, further comprising the step of delivering fasteners to the storage track from a bulk source of fasteners prior to docking the fastener insertion apparatus with the docking station.

21. A method according to claim 20, wherein the fasteners are blown to the storage track in a delivery tube via gas pressure.

22. A method according to claim 21, wherein the same gas pressure is used to transfer the fasteners to the buffer when the fastener insertion apparatus is docked.

23. A method according to claim 21, wherein a separate source of gas pressure is applied to transfer the fasteners to the buffer.

24. A method according to claim 23, wherein the separate source of gas pressure in applied through a port in the storage track.

25. A method according to claim 16, further comprising the step of detecting whether the storage track at the docking station has been filled to a predetermined level.

26. A method according to claim 25, wherein if no fastener is detected at the predetermined level further fasteners are delivered to the storage track and if a fastener is detected no such fasteners are delivered.

27. A method according to claim 25, wherein a probe is used to detect whether a fastener is present at said level, the probe being movable between a retracted position in which it is clear of the storage track and an extended position where is extends into the track.

28. A method according to claim 27, the probe being movable between said retracted position and a fully extended position where it extends across the track thereby identifying that there is no fastener present at said level, the probe being in a partially extended position when it detects the presence of the fastener and being in contact with the fastener in the partially extended position.

29. A method according to claim 28, wherein the fastener has a head and a shank, the probe contacting an end of the fastener opposite the head.

30. A method according to claim 16, wherein the fasteners are held in the storage track of the docking station prior to transfer to the buffer of the insertion apparatus.

31. A method according to claim 30, wherein the fasteners are selectively held in the storage track by a gate that is movable between an open position in which allows fasteners to drop out of the storage track and a closed position in which it prevents such movement of the fasteners.

32. A method according to claim 31, wherein the gate has a passage for pressurised gas that is in brought into communication with the storage track when the gate is in the closed position so that fasteners can be propelled into the buffer of the insertion apparatus.

33. A method according to claims 16, wherein the fasteners in the storage track are allowed to drop back out of the storage track under gravity before being transferred to the buffer.

34. A method according to claim 16, wherein when the apparatus is docked to the station, the storage track is aligned with the track in the buffer.

35. A method according to claim 1, comprising the step of providing the docking station and the fastener insertion each with a transfer gate, the gates being moved in unison between open and closed positions when the apparatus is docked to the stand.

36. A method according to claim 1, wherein any pre-existing fasteners in the buffer are held there whilst the insertion apparatus docks with the docking stand.

37. Fastener feed apparatus for feeding fasteners to a fastener insertion tool, the apparatus comprising a movable buffer for the temporary storage of a plurality of fasteners in a track defined by the buffer, the buffer having an inlet and an outlet and being configured to be located proximate the tool and for movement therewith, a first delivery track for transporting fasteners from an outlet of the buffer towards a fastener delivery passage of the tool, a docking station at which the buffer is to be docked to enable it to be refilled with fasteners, a second delivery track for transporting fasteners from a source to the docking station, a first docking interface defined at or near the inlet of the buffer and a second docking interface defined by the docking station, the fastener insertion tool being moveable from an undocked position to a docked position where the first and second docking interfaces are docked together, a first transfer device for transferring fasteners from the docking station into the buffer, a retaining member for retaining a pre-selected quantity of fasteners in the buffer against movement back towards the docking station, any fasteners in the buffer in excess of said pre-selected quantity being allowed by the retaining member to move back towards the docking station, at least one transfer gate disposed at one of said first and second docking interfaces, the gate being movable between an open position whereby fasteners can be transferred past the gate from the docking station to the inlet of the buffer and a closed position where fasteners are prevented from passing the gate, the transfer gate comprising a member having a fastener opening therethrough, wherein in the open position the opening is aligned with the buffer track and in the closed position it is out of alignment therewith.

38. Apparatus according to claim 37, wherein the transfer gate is slidable between the open and closed positions.

39. Apparatus according to claim 38, the transfer gate being movable by an actuator controlled by a control system.

40. Apparatus according to claim 37, wherein the transfer gate is disposed at the inlet of the buffer.

41. Apparatus according to claim 37, wherein the retaining member is movable between a withdrawn position where it is does not contact the fasteners and an operative position where it extends into the buffer track at a pre-selected position between the inlet and a predetermined distance from the outlet of the buffer, said predetermined distance corresponding to that which said pre-selected quantity of fasteners would occupy in the buffer.

42. Apparatus according to claim 41, wherein the buffer has a housing and the retaining member extends through a port in the housing and into the track when in the operative position such that, when in use, it contacts a fastener, if present, at said pre-selected position.

43. Apparatus according to claim 41, wherein the buffer track is designed to accommodate fasteners with a head and a shank, the track defining a support surface for supporting the underside of the head, and a relatively narrow opening for receipt of the shank.

44. Apparatus according to claim 43, wherein the track defines a T-shaped cross-section opening, with the transition between the head and stem of the T defining the support surface.

45. Apparatus according to claim 44, wherein the retaining member, when in the operative position, projects into the track from a side opposite said surfaces so as, in use, to contact an underside of the shank of the fastener.

46. Apparatus according to claim 41, wherein the retaining member is a slidable member mounted adjacent to the port in the buffer housing.

47. Apparatus according to claim 46, wherein the transfer gate is at the outlet of the delivery track.

48. Apparatus according to claim 47, wherein the transfer gate has a fastener opening that is aligned with the outlet of the storage track when the gate is in the open position and is not aligned when the gate is in the closed position.

49. Apparatus according to claim 48, wherein the transfer gate comprises a first gate section at the buffer inlet and a second gate section at the outlet of the storage track, the two gate sections being movable in unison when the insertion apparatus is docked at the docking stand.

50. Apparatus according to claim 49, wherein there are co-operating engagement members for connecting the transfer gate sections together.

51. Apparatus according to claim 49, wherein the transfer gate is movable by an actuator that is located adjacent to the storage track.

52. Apparatus according to claim 48, wherein the transfer gate sections each defined docking faces that come into abutment when the docking interfaces are docked.

53. Apparatus according to claim 41 wherein the port and the retaining member are disposed adjacent to the inlet of buffer.

54. Apparatus according to claim 41, wherein there is provided means for detecting when the buffer is loaded with said pre-selected quantity of fasteners.

55. Apparatus according to claim 54, wherein the retaining member is the means for detecting.

56. Apparatus according to claim 55, wherein the retaining member is movable between a fully extended position in the track wherein there is no fastener present at said pre-selected position, and a partially extended position in which it contacts a fastener.

57. Apparatus according to claim 37, wherein the retaining member is movable by an actuator that is controlled by a control system.

58. Apparatus according to claim 37, wherein there is provided means for detecting when the buffer is loaded with said pre-selected quantity of fasteners.

59. Apparatus according to claim 37, wherein the retaining member is adjacent to transfer gate.

60. Apparatus according to claim 37, wherein the buffer is in the form of a magazine.

61. Apparatus according to claim 37, wherein the retaining member occupies a sealed housing.

62. Apparatus according to claim 37, wherein the docking station has a storage track for temporary storage of a plurality of fasteners, the track having an inlet for connection to a source of fasteners and an outlet for communication with the inlet of the buffer.

63. Apparatus according to claim 62, wherein there is provided means for detecting whether or not the storage track contains a pre-determined quantity of fasteners.

64. Apparatus according to claim 63, wherein the means for detecting is a probe that is movable between a retracted position where it is clear of the track and an extended position in which it extends into the track.

65. Apparatus according to claim 64, wherein the probe is movable between the retracted position, a fully extended position where there is no fastener present and it extends across the track, and a partially extended position where it extends partially across the track and is prevented from moving to the fully extended position by the presence of a fastener, it being determined that a fastener is present by the fact that the probe is in the partially extended position.

66. Apparatus according to claim 65, wherein the storage track is defined by a housing and the probe is extensible through a port in the housing and into the track.

67. Apparatus according to claim 66, wherein the storage track is designed to accommodate fasteners with a head and a shank, the track defining a support surface for supporting the underside of the head, and a relatively narrow opening for receipt of the shank.

68. Apparatus according to claim 67, wherein the track defines a T-shaped cross-section opening, with the transition between the head and stem of the T defining the support surface.

69. Apparatus according to claim 68, wherein the port opens to the bottom of the stem of the T-shaped opening.

70. Apparatus according to claim 64, wherein the probe is disposed proximate to the inlet of the storage track.

71. Apparatus according to claim 62, wherein the probe is housed in a sealed housing.

72. Apparatus according to claim 62, wherein the first transfer device comprises a passage proximate the inlet of the storage track for supply of pressurised gas to the track in a direction towards the storage track outlet.

73. Apparatus according to claim 72, when dependent on claim 69, wherein the passage is defined a wall of said housing.

74. Apparatus according to claim 62, wherein there is provided a retaining member for retaining fasteners in the storage track.

75. Apparatus according to claim 74, wherein the retaining member is a gate disposed at or adjacent to said inlet, the gate being movable between an open position wherein the inlet is open to the passage of fasteners and a closed position where it blocks the inlet and fasteners may be retained in the track.

76. Apparatus according to claim 75, wherein the gate is movable laterally of the track.

77. Apparatus according to claim 75, wherein the first transfer device comprises a compressed gas passage in the gate for connection to a source of compressed gas.

78. Apparatus according to claim 77, wherein the compressed gas passage is configured to be in communication with the storage track when the gate is in the closed position so that gas may be used to propel the fasteners up the track and to transfer them across to the buffer.

79. Apparatus according to claim 62, further comprising a supply delivery track having an inlet for connection to a source of fasteners and an outlet for connection to the storage track of the docking station.

80. Apparatus according to claim 79, wherein the compressed gas passage is sealed from communication with the supply delivery track.

81. Apparatus according to claim 80, wherein there is provided a first source of pressurised gas for propelling fasteners along the supply delivery track to the docking station.

82. Apparatus according to claim 81, wherein the first transfer device comprises a second source of pressurised gas for propelling fasteners from the docking station to the buffer.

83. Apparatus according to claim 62, wherein the storage track is rigid.

84. Apparatus according to claim 62, wherein the track is substantially upright.

85. Apparatus according to claim 37, wherein the docking station comprises a stand having a base for mounting on the floor.

86. Apparatus according to claim 37, wherein the buffer is a rigid member.

87. Apparatus according to claim 86, wherein the supply delivery track is flexible.

88. Apparatus according to claim 37, wherein the buffer is disposed substantially upright such that when the gate is open and no force is applied to propel the fasteners and the retaining member is not in an operative position where it is retaining said fasteners, said fasteners are free to fall back to the docking station under gravity.

89. Apparatus according to claim 37, wherein the fasteners are rivets.

90. Fastener feed apparatus for feeding fasteners to a fastener insertion tool, the apparatus comprising a movable buffer for the temporary storage of a plurality of fasteners in a track defined by the buffer, the buffer having an inlet and an outlet and being configured to be located proximate the tool and for movement therewith, a first delivery track for transporting fasteners from an outlet of the buffer towards a fastener delivery passage of the tool, a docking station at which the buffer is to be docked to enable it to be refilled with fasteners, a second delivery track for transporting fasteners from a source to the docking station, a first docking interface defined at or near the inlet of the buffer and a second docking interface defined by the docking station, the fastener insertion tool being moveable from an undocked position to a docked position where the first and second docking interfaces are docked together, a first transfer device for transferring fasteners from the docking station into the buffer, a retaining member for retaining a pre-selected quantity of fasteners in the buffer against movement back towards the docking station, any fasteners in the buffer in excess of said pre-selected quantity being allowed by the retaining member to move back towards the docking station, at least one transfer gate disposed at one of said first and second docking interfaces, the gate being movable between an open position whereby fasteners can be transferred past the gate from the docking station to the inlet of the buffer and a closed position where fasteners are prevented from passing the gate, and a second transfer device for transferring any excess fasteners transferred to the buffer behind the retained fasteners back to the docking station, wherein said second transfer device comprises a passage defined in the transfer gate for the direction of pressurised gas to a position in the buffer between the inlet and a predetermined distance from the outlet of the buffer, said predetermined distance corresponding to that which said pre-selected quantity of fasteners would occupy in the buffer, the transfer gate comprising a member having a fastener opening therethrough, wherein in the open position the opening is aligned with the buffer track and in the closed position it is out of alignment therewith.

91. Apparatus according to claim 90, wherein the passage is adjacent to the opening.

92. A method of manufacturing a joint including feeding fasteners to fastener insertion apparatus, the apparatus comprising a fastener insertion tool, a buffer for the temporary storage of fasteners in a track defined by the buffer, the buffer being proximate the tool and having an inlet and a delivery track for transporting fasteners from the buffer towards a fastener delivery passage of the tool, the insertion apparatus being movable between an operative position where it is able to insert fasteners via the delivery passage in the tool into a workpiece and a re-filling position where it is docked at a docking station so as to permit the buffer to be loaded with fasteners from a source of fasteners connected to the docking station, the method comprising the steps of moving the insertion apparatus to the refilling position such that the buffer is docked to the docking station, transferring fasteners from the docking station into the buffer via the inlet, then expelling from the buffer any excess loaded fasteners that are in excess of a predetermined level back through the buffer inlet to the docking station, undocking the insertion apparatus from the docking station, transferring at least one fastener from the buffer to the fastener insertion tool, and then using the fastener insertion apparatus to insert a fastener into or onto a workpiece.

\* \* \* \* \*